Figure 1:
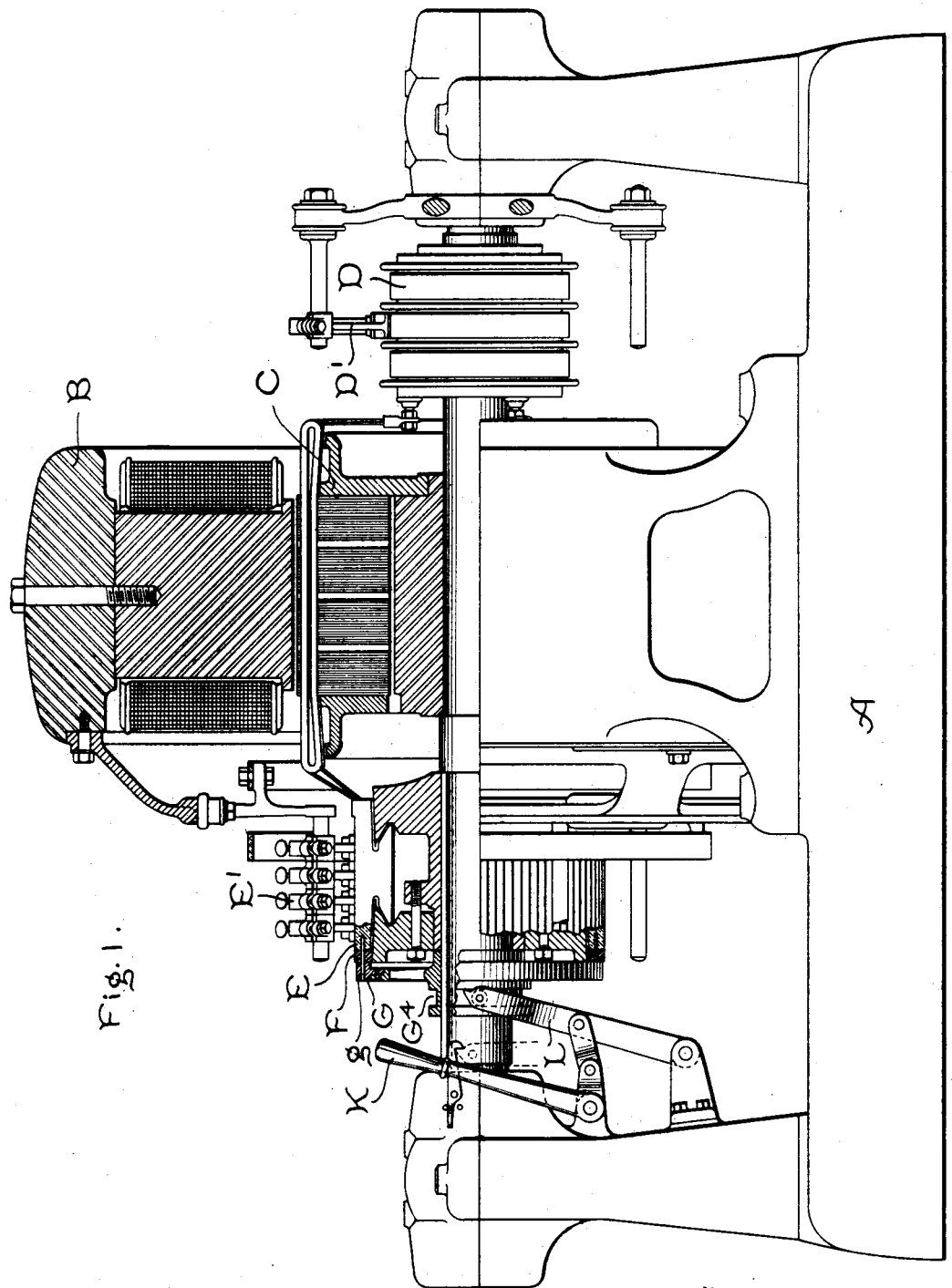

No. 713,445. Patented Nov. 11, 1902.
T. J. JOHNSTON.
STARTING ALTERNATING CURRENT MOTORS.
(Application filed Apr. 8, 1899.)
(No Model.) 3 Sheets—Sheet 1.

Witnesses.
Arthur H. Abell.
Benjamin B. Hull

Inventor.
Thomas J. Johnston,
by Albert G. Davis
Atty.

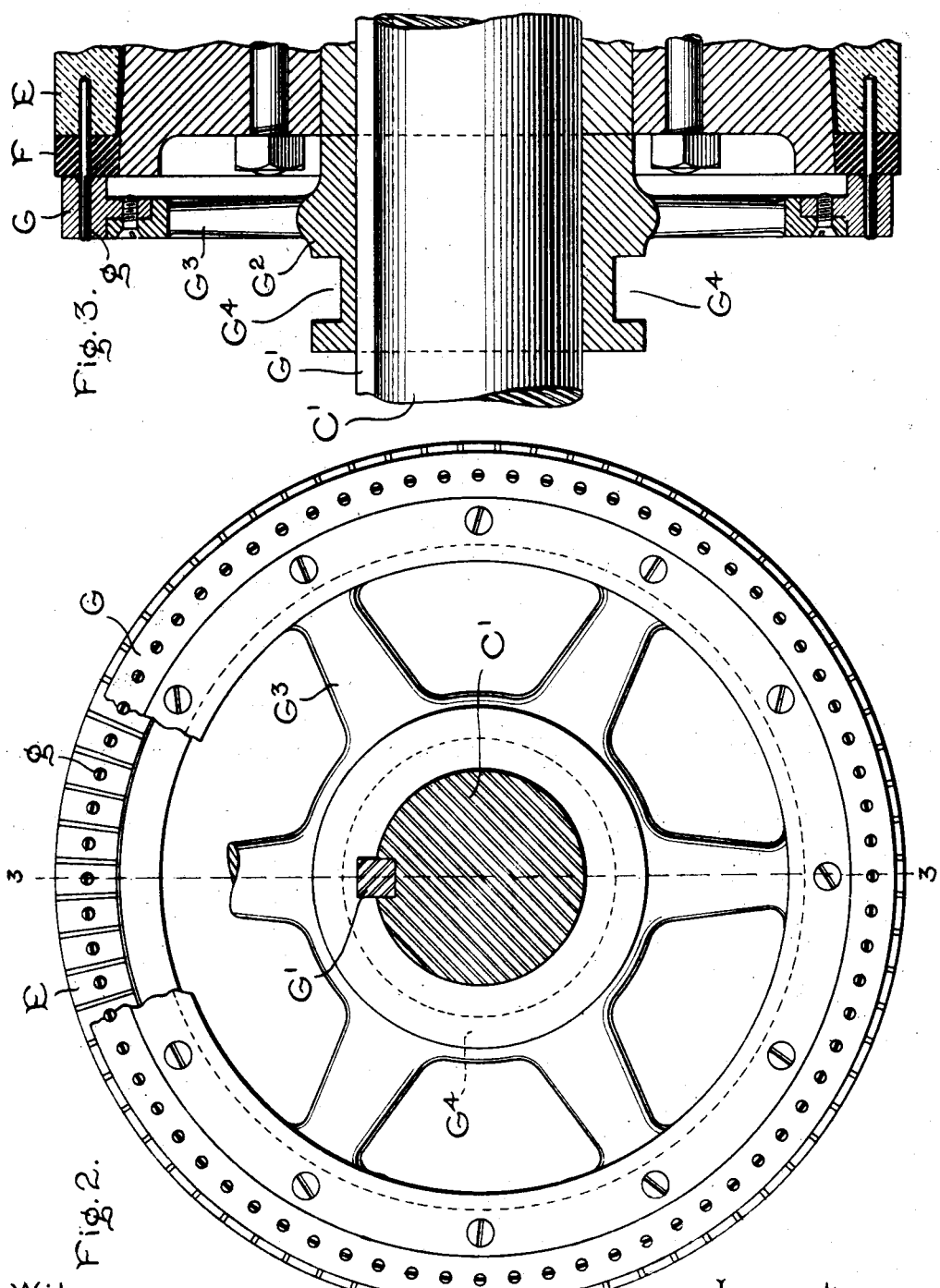

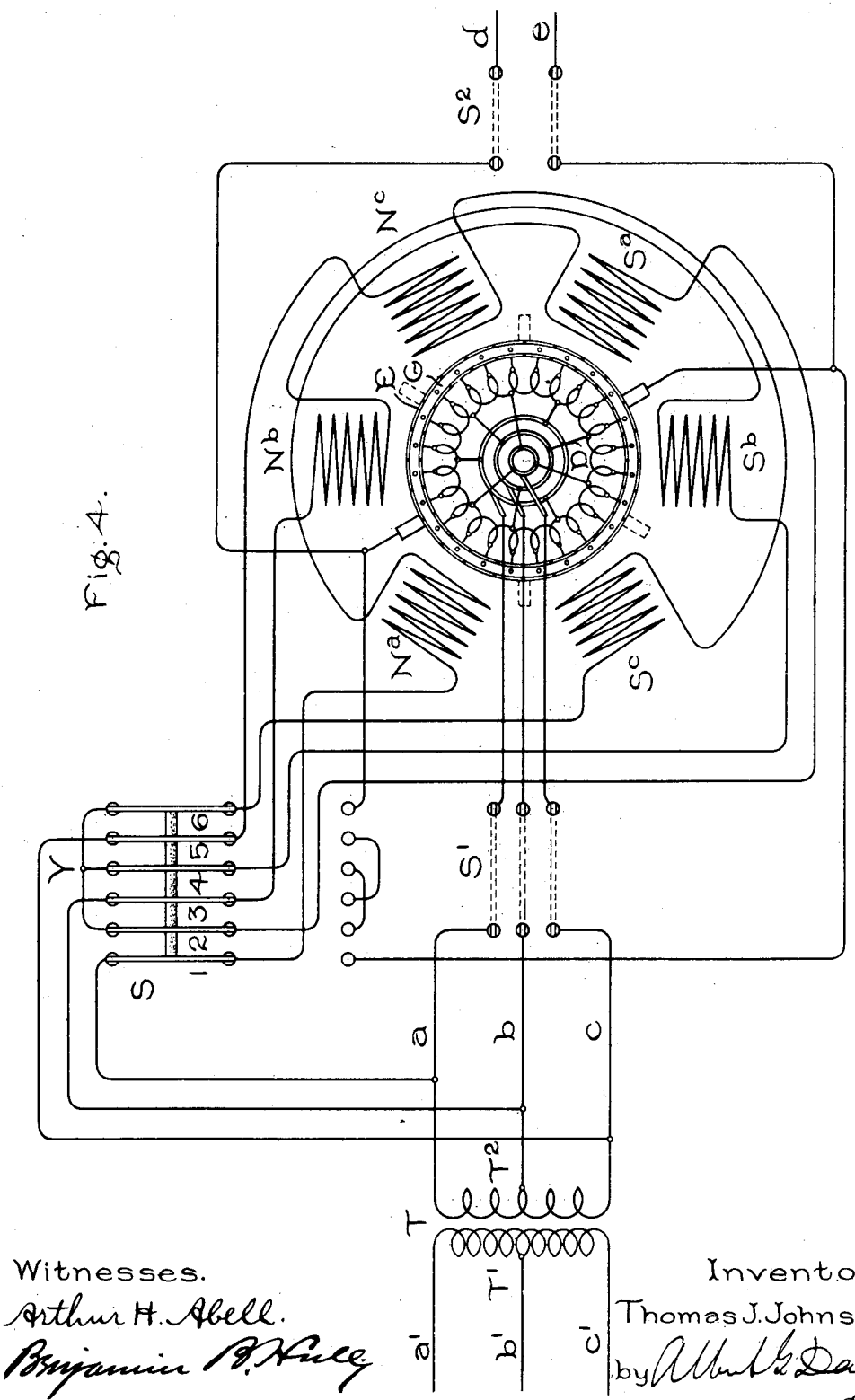

UNITED STATES PATENT OFFICE.

THOMAS J. JOHNSTON, OF NEW YORK, N. Y., ASSIGNOR TO GENERAL ELECTRIC COMPANY, A CORPORATION OF NEW YORK.

STARTING ALTERNATING-CURRENT MOTORS.

SPECIFICATION forming part of Letters Patent No. 713,445, dated November 11, 1902.

Application filed April 8, 1899. Serial No. 712,200. (No model.)

*To all whom it may concern:*

Be it known that I, THOMAS J. JOHNSTON, a citizen of the United States, residing at New York, in the county of New York and State of New York, have invented certain new and useful Improvements in Starting Alternating-Current Motors, (Case No. 1,185,) of which the following is a specification.

My present invention relates to starting alternating-current motors. It has for its object to provide a simple and efficient method of starting alternating-current motors of the synchronous type, rotary converters, or similar machines.

Under ordinary conditions the starting of a synchronous motor is attended with a rush of current in the armature, for which reason cumbersome and costly starting devices operating by objectionable electrical methods have been proposed and to some extent adopted. Nearly all of these apparatus are open to objection, especially on account of the increased cost involved in their use. In many cases synchronous motors need to be started but once or twice a day, often even less. The starting device would therefore be employed for but a few moments in the twenty-four hours, so that its all-day efficiency is practically zero. In other cases a compensator has been employed, and although it is a good starting device it is not only open to the objections already noted, but in addition it cuts down the impressed electromotive force and torque so that the starting of the motor is quite slow, and it takes perceptibly longer to run up to synchronism. The starting torque with this arrangement being low, when any undue friction occurs the motor may not start at all. This is a peculiarly disastrous accident, because before the counter electromotive force of the synchronous motor runs up the armature is a direct short circuit across the mains of the alternating-current system. It is this which causes the great rush of current at starting. Under some conditions it has been proposed to use resistances in the line-circuit; but this method is wasteful and objectionable. It has also been proposed to speed up the armature of the synchronous machine by an induction-motor, which should be geared to it. This is also objectionable, because the induction-machine does not attain synchronism and the defect has to be overcome by gearing up. This is, moreover, a complex and expensive arrangement. For these devices I substitute a change in connections of the synchronous machine, which may be readily effected by ordinary switches of common construction. The method of operation involved is, briefly, feeding the fields of the machine with the alternating current, first opening the connection from the main line to the armature-circuit at the collecting-rings or by a suitable switch. The armature is placed on short circuit and starts with considerable torque, like any ordinary induction-motor, and gradually runs up to nearly synchronous speed. After approximating synchronism, if the motor be polyphase it may be changed from an induction-machine to synchronous and the rotary field torque would bring it up to synchronism. This, however, is not the best method of exercising the invention, as will presently be pointed out, on account of the fluctuations of electromotive force which tend to disturb the system and which in a lighting-system are prohibitive of such a method of operation. I therefore so arrange the device that while the alternating current is flowing in the field-circuit the number of poles is permuted to be less than that used when the continuous-current field is employed. By this method of operation the armature is driven considerably above the speed due to the normal frequency in the circuit. It is of course manifest that this permutation may be anything desired—that is, the combination may be such that the armature will be revolved at very high speed if allowed under these conditions to attain synchronism, by which I mean that speed which will correspond to the number of pairs of poles into the alternations. For instance, I have illustrated in this application a six-pole machine, and with this I arrange the switches so that the alternating current generates a bipolar field. Thus the armature is rapidly and powerfully accelerated to a speed in excess of normal synchronism. Afterward the switches may be thrown, shifting the alternating current to the armature and coupling the field upon the source of continuous current. Commonly the motor is self-excited and its field is shunt-wound. Thus when energy at the normal frequency is supplied to the armature-circuits the machine gradually slows down until it falls into step, and this without any excessive fluctuation.

The above method of operation is improved by so arranging the machine when running as an induction-motor that resistance may be interpolated in its armature-circuit. This can readily be done by opening the circuit at one or more points (depending upon the winding of the machine) and cutting in resistance by a suitable switch, the resistance being subsequently cut out as the machine begins to speed up. It is manifest that the same method of operation may be conveniently applied to rotary converters, either of the double-wound or of that now well-known type in which the same armature-winding is used on both sides of the machine—that is, an armature-winding connected at suitable equidistant points to collector-rings and each of its coils in succession connected to a commutator, so that the alternating current is rectified and fed to continuous-current-translating devices. This class of apparatus is most usually applied to railway-work, and here the fluctuations of voltage occasioned by interpolating a new machine in circuit are not of so great importance as in lighting apparatus, so that under some conditions the resistance might be dispensed with. Nevertheless it is desirable that the voltage be kept as nearly constant as possible. When the rotary converter is applied to lighting, it is highly objectionable that it should cause any substantial variation of potential difference between the mains, and under these circumstances my invention is particularly useful. I prefer that the close-circuiting ring shall act directly upon the commutator. This may be most conveniently applied by mounting it upon a collar which can revolve with the shaft, the collar engaging with a feather-key, so that it may be brought into engagement by suitable pins or similar switching contact devices with the different segments of the commutator. In this way when the alternating-current side of the armature is opened and the collar is thrown in the winding becomes a series of short-circuited coils. By making the collar and pins of thin German silver a considerable resistance relative to the resistance of the armature-coil may be included in circuit. As the collar is withdrawn the closed circuits are opened, after which (by preference) a suitable switch may be thrown to connect the machine either to the continuous-current bus-bars or to such other load as it may be designed to carry. The permutation of the field-circuits already referred to is efficaciously employed in both cases. Not only does this permutation secure the high acceleration which is desirable in starting alternating-current machines, by which they are carried above synchronism and allowed to "catch" as the speed of the armature diminishes, but inasmuch as it lowers both the ohmic and inductive resistance of the usual shunt-winding employed for the continuous-current field it greatly increases the admittance of the field-magnet winding for the alternating current. At the same time the inductive proximity of the closed-circuited windings on the armature also lessens the self-induction of the field-winding and again adds to the admittance. This is particularly useful in the polyphase types of apparatus, because in these the effective voltage is even lower than in single-phase machines with reference to the continuous-current side. The field-winding is necessarily wound for the continuous-current voltage. For instance, in a three-phase system the alternating-current voltage is only about two-thirds that of the continuous, and in other systems it is also lower.

The invention is applicable, as the engineer will perceive, to all types of synchronous alternating motors. Some of these are separately excited, in which case it will be necessary to provide devices for closing the armature-circuits in the way desired. In the case of the self-excited synchronous machine and of the rotary converter (which is only a specific case of self-excited machine) it is apparent that the commutator may conveniently be used to effect the desired closure of the armature-circuits. It is further manifest that the skill of the electrician will prescribe changes in the windings which may not be described in this specification, but which would yet be within the invention. For example, in all the types of alternating-current motor described it may not be necessary to close each one of the armature-coils as an independent circuit. A selected number may be employed—such, for example, in a six-pole machine as seven or five—which is prime to the number of field-poles, and therefore involves no liability of "locking" the armature. In a series-wound armature this coupling of a number of the coils in series between the connecting points which close the circuits also increases the resistance of the armature-winding, so as to still further prevent the undesirable rush of current in starting. Again, in the illustrated connection of the field-poles the Y system is employed; but it is plain that it is within the skill of the electrician to substitute a delta connection.

The accompanying drawings show an application of the invention to a three-phase rotary converter as perhaps the most convenient way of exemplifying the construction preferred.

Figure 1 is a side elevation, partly in section, of this piece of apparatus. Figs. 2 and 3 are enlarged details showing the close-circuiting ring. Fig. 4 is a diagram of the circuits.

In Fig. 1, A is the base of the machine. B is the field-magnet structure, a polar field-magnet being shown, as this is in general the best form for rotary converters and synchronous motors. C is the armature, provided at one side with the alternating-current-collecting device D, (illustrated as consisting of three rings.) Suitable brushes are of course employed, only one of these, D', being illustrated. E is the commutator, provided with the brushes E'.

The construction of the close-circuiting ring to which I have referred is best seen in Figs. 2 and 3, Fig. 2 being an end elevation, and Fig. 3 a partial section on the line 3 3 of Fig. 2, of the preferred construction. A ring of insulation F is applied to the commutator, against which bears, when the armature-circuits are closed, a ring G of resistance material, such as German silver. In some cases, however, where the desired resistance permits the ring might be made of iron or steel. Pins $g$ are fast in holes in the commutator-bars. They are split upon their ends, so as to easily effect contact with holes in the ring G. The ring is carried upon a spider having arms $G^3$ and a hub $G^2$, sliding upon the shaft C'. A spline G' insures the turning of the ring with the commutator, keeping the pins and the holes in the ring in registry. A handle K (see Fig. 1) by means of the pivoted yoke L, having rollers sliding in the groove $G^4$ of the hub, serves to move the ring G, so as to engage the pins or to release them, as may be desired.

The combination of circuits is best understood from Fig. 4. T is the transformer, having the primary and secondary coils T' T². Of course the motor might, if desired, be directly connected to line where proper precautions were taken to handle the high-potential currents. The lines $a'$ $b'$ $c'$ feed the primary, and current passes from the secondary over the lines $a$ $b$ $c$. Switches S S' S² are provided for manipulating the apparatus. The switch S is a double-throw six-pole switch. Its blades are numbered from "1" to "6," and it is illustrated in the position in which the fields of the motor are supplied with alternating current. It will be noted that in this position some of the contacts are cross-connected at Y, and this forms the common junction of the Y-winding formed by the six poles, which make with this connection a bipolar alternating field of the so-called "rotating" type. Starting from the secondary line $a$, the circuit passes over blade 1 of the switch, thence through the fields $N^a S^a$ back to blade 2 of the switch to the Y. From $b$ the circuit is over blade 3 of the switch, then through the fields $N^b S^b$ to blade 4 and back to the Y, while from line $c$ the circuit is over blade 5 of the switch, through the fields $N^c S^c$ and over blade 6 of the switch to the Y. Thus it will be seen that the alternating current is fed through the field-winding. The switch S' (shown in dotted lines) is at this time open, so that the current of course does not pass to the armature. At the same time the ring G is pressed against the end of the commutator, closing the circuits of the armature. I have not shown the commutator cross connections, which are well known in the art. These cross connections themselves may form sufficient short circuits during the time of starting, as the machine then has only one polar line. The switch S² is also open, so that no load is thrown upon the machine, its armature being cut off completely and running as an induction-motor. The armature then starts and, as already pointed out in the statement of invention, accelerates with considerable rapidity until it is running somewhat above normal synchronism. This may be determined in the usual way by a tachometer or by pilot-lamps or in any other way. After the machine has run up to speed, or as nearly so as may be desired, the switch S is opened, the switch S' is closed, and then the switch S may be brought to its back contacts. It is manifest that, if desired, the two switches may be embodied in one and the operations here described successively may be either as nearly simultaneous as possible or there may be a small time interval between them without detriment, inasmuch as the momentum of the armature will carry it. Of course the lever K will also be thrown at the same time, so that the armature-circuits are opened practically simultaneously with the cutting off of the alternating current from the fields. When the switch S is thrown to the back contacts, the fields are connected in series across the continuous-current mains $de$, supplied from the commutator E, this being the usual connection of self-excited motors or converters. It will then pick up its share of the load, which may be adjusted in the usual way, unnecessary to illustrate or describe.

What I claim as new, and desire to secure by Letters Patent of the United States, is—

1. The improvement in the art of operating an alternating-current dynamo-electric machine, which consists in starting the machine as an induction-machine, and after it approximates synchronism converting it into a synchronous machine, and reversing the relations of induced and inducing members.

2. The improvement in the art of operating an alternating-current synchronous dynamo-electric machine, which consists in feeding the alternating current to the field-magnet windings of the machine, closing the armature-circuits so as to rotate the armature as an induction-machine, and after the armature attains approximate synchronism feeding the alternating current to the armature and energizing the fields with continuous current.

3. The improvement in the art of operating an alternating-current synchronous dynamo-electric machine, which consists in disconnecting the armature from the alternating circuit, feeding the alternating current to the field-magnet windings of the machine, closing the armature-circuits so as to rotate the armature as an induction-machine, and after the armature attains approximate synchronism feeding the alternating current to the armature and energizing the fields with continuous current.

4. The improvement in the art of operating an alternating-current dynamo-electric machine, which consists in closing the armature-circuits of the machine at starting and opening the connection between the armature and the alternating-current mains, feeding the fields with alternating currents until synchronism is reached or approximately reached, then opening the armature-circuits, and feeding the armature with alternating current and the fields with continuous current.

5. The improvement in the art of operating an alternating-current dynamo-electric machine, which consists in closing the armature-circuits through a resistance, feeding the fields with alternating currents until the armature attains approximate synchronism as an induction-machine, then opening the armature-circuits, and feeding the armature with alternating current and the fields with continuous current.

6. The improvement in the art of operating an alternating-current dynamo-electric machine, which consists in closing the armature-circuits through a resistance, and breaking the connection between the armature and the exterior source of current, feeding the fields with alternating currents until the armature attains approximate synchronism as an induction-machine, then opening the armature-circuits, and feeding the armature with alternating current and the fields with continuous current.

7. The improvement in the art of operating an alternating-current motor, which consists in starting the motor as an induction-machine having a less number of poles than are used in continuous operation, and when synchronism is reached or approximately reached, converting the machine into a synchronous motor with a normal number of poles.

8. The improvement in the art of operating an alternating-current motor, which consists in operating the motor as an induction-machine at starting, permuting the fields from multipolar to bipolar, and when the armature has attained the desired speed converting it into a synchronous machine with multipolar field.

In witness whereof I have hereunto set my hand this 6th day of April, 1899.

THOMAS J. JOHNSTON.

Witnesses:
BENJAMIN B. HULL,
MABEL E. JACOBSON.